(12) United States Patent
Hong et al.

(10) Patent No.: US 9,607,238 B2
(45) Date of Patent: Mar. 28, 2017

(54) IMAGE NOISE LEVEL DETECTION AND REMOVAL SYSTEM AND METHOD

(71) Applicant: Foundation of Soongsil University-Industry Cooperation, Seoul (KR)

(72) Inventors: Min-Cheol Hong, Seoul (KR); Tuan-Anh Nguyen, Seoul (KR); Beomsu Kim, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 190 days.

(21) Appl. No.: 14/429,738

(22) PCT Filed: Aug. 7, 2013

(86) PCT No.: PCT/KR2013/007141
§ 371 (c)(1),
(2) Date: Mar. 19, 2015

(87) PCT Pub. No.: WO2015/005519
PCT Pub. Date: Jan. 15, 2015

(65) Prior Publication Data
US 2015/0235100 A1 Aug. 20, 2015

(30) Foreign Application Priority Data

Jul. 11, 2013 (KR) .................. 10-2013-0081349

(51) Int. Cl.
*G06K 9/48* (2006.01)
*G06K 9/46* (2006.01)
(Continued)

(52) U.S. Cl.
CPC .............. *G06K 9/46* (2013.01); *G06K 9/52* (2013.01); *G06K 9/6267* (2013.01); *G06T 5/00* (2013.01); *G06T 5/001* (2013.01)

(58) Field of Classification Search
CPC .......... G06K 9/46; G06K 9/52; G06K 9/6267; G06T 5/00; G06T 5/001; G06T 5/002
See application file for complete search history.

(56) References Cited

U.S. PATENT DOCUMENTS 6,633,683 B1 * 10/2003 Dinh ..................... G06K 9/40
345/611
2008/0239094 A1 10/2008 Baqai et al.

FOREIGN PATENT DOCUMENTS

JP 2002-204457 A 7/2002
JP 2010-130636 A 6/2010
(Continued)

OTHER PUBLICATIONS

Nguyen et al., "Filtering-Based Noise Estimation for Denoising the Image Degraded by Gaussian Noise", Nov. 23, 2011, Springer, PSIVT 2011: Advances in Image and Video Technology, Part II, LNCS 7088, pp. 157-167.*

(Continued)

*Primary Examiner* — Chan Park
*Assistant Examiner* — Timothy Choi
(74) *Attorney, Agent, or Firm* — Novick, Kim & Lee, PLLC; Sang Ho Lee

(57) ABSTRACT

An image processing system and method is provided. The image processing system includes extracting a first local statistical characteristics from an observed image, generating a low-pass filter according to the first local statistical characteristics to generate a predicted noise image, and extracting second local statistical characteristics from the predicted noise image, extracting a third local statistical characteristics from a predicted original image using the first (Continued)

local statistical characteristics of the observed image and the second local statistical characteristics of the predicted noise image, and setting a flag level indicating a noise level for each pixel of the observed image according to the third local statistical characteristics of the predicted original image to detect noise, and setting a filter coefficient according to the flag level of the detected noise to remove the noise, and restoring the observed image.

11 Claims, 4 Drawing Sheets

(51) Int. Cl.
  *G06K 9/62* (2006.01)
  *G06K 9/52* (2006.01)
  *G06T 5/00* (2006.01)

(56) References Cited

FOREIGN PATENT DOCUMENTS

| KR | 1020050066730 A | 6/2005 |
|---|---|---|
| KR | 10-2006-0091436 A | 8/2006 |
| KR | 100759517 B1 | 9/2007 |
| KR | 10-0835792 B1 | 6/2008 |
| KR | 10-2009-0075507 A | 7/2009 |
| KR | 100996281 B1 | 11/2010 |
| KR | 10-2011-0040465 A | 4/2011 |

OTHER PUBLICATIONS

Kuan et al., "Adaptive Noise Smoothing Filter for Images with Signal-Dependent Noise", Mar. 1985, IEEE, Transactions on Pattern Analysis and Machine Intelligence, vol. 7, No. 2, p. 165-177.*

Lee, "Digital Image Enhancement and Noise Filtering by Use of Local Statistics", Mar. 1980, IEEE, Transactions on Pattern Analysis and Machine Intelligence, vol. 2, No. 2, p. 165-168.*

Buades et al., "A Review of Image Denoising Algorithms, With a New One", Jul. 18, 2005, Society for Industrial and Applied Mathematics, Muliscale Modeling & Simulation, vol. 4, iss. 2, p. 490-530.*

Nguyen, Tuan-Anh et al. "Adaptive Noise Detection and Removal Algorithm Using Local Statistics and Noise Estimation". The Journal of Korean Institute of Communications and Information Sciences, vol. 38A, No. 02, pp. 183-190 (Feb. 19, 2013).

* cited by examiner

IMAGE NOISE LEVEL DETECTION AND REMOVAL SYSTEM AND METHOD

STATEMENT REGARDING PRIOR DISCLOSURES

A thesis paper entitled "Adaptive Noise Detection and Removal Algorithm Using Local Statistics and Noise Estimation" published on Feb. 19, 2013, does not qualify as prior art under AIA 35 U.S.C. 102(b)(1)(A) as the disclosure was made by the joint inventors. A copy of the thesis paper is submitted herewith in an Information Disclosure Statement.

TECHNICAL FIELD

The present invention relates to an image processing system and method that may apply spatially adaptive noise detection and removal techniques to distorted images.

BACKGROUND ART

In general, a digital image is expressed in the form in which noise was attached to an original image by an image system or the like in a process in which the digital image is acquired as analog signals and a process in which the digital image is converted into digital signals. An image distorted by the attached noise may be a factor of a reduction in compression efficiency due to an increase of high-frequency component in an image compressing process, and may be a factor of a reduction in a recognition rate in an image recognition system. The image distortion phenomenon due to the attached noise may cause problems in various image application fields, and therefore it is very important to effectively minimize the attached noise in a pre-processing process in order to maximize the performance of the corresponding application system.

Meanwhile, the ultimate goal of noise removal techniques is to generate a restored image close to the original image while preserving detailed information and boundaries, and various related techniques have been proposed. Noise generated in the acquisition process of most image systems has Gaussian distribution characteristics, and as the representative technique concerning such noise characteristics, a least mean square (LMS) technique has been used. The above-described technique is accompanied by an image contour degradation phenomenon in a filtering process. In the representative technique based on local statistical properties, an average filter and a median filter have been used, and weight-based local media filter technique that is a modified type has been studied, but has a limit in the minimization of the degradation phenomenon.

In order to minimize the degradation phenomenon, various methods to give local adaptability have been studied. As the representative method, a two-way filter technique in which differences of local statistical characteristics and radiation analysis between pixels are utilized in the weight of the filter has been studied. However, the two-way filter technique is significantly effective for maintaining a contour component of a restored image compared to an existing technique, but is unsatisfactory for a noise detection process for determining the presence and absence of noise, and therefore the two-way filter technique has a limitation in the performance improvement when an amount of the attached noise is small.

DISCLOSURE

Technical Problem to be Solved

The present invention is directed to providing an image processing system and method which may predict attached noise information according to local statistical characteristics of an observed image and implement a noise detection and removal technique based on the predicted noise information.

Technical Solution

One aspect of the present invention provides an image processing system including: a noise detection unit that includes an observed image local statistical extraction unit that extracts local statistical characteristics of an observed image, a low-pass filter design unit that designs a low-pass Gaussian filter according to the local statistical characteristics of the observed image, a predicted noise image generation unit that generates a predicted noise image using the low-pass Gaussian filter, a predicted noise image local statistical extraction unit that extracts local statistical characteristics of the predicted noise image, a predicted original image local statistical extraction unit that extracts local statistical characteristics of a predicted original image using the local statistical characteristics of the observed image and the local statistical characteristics of the predicted noise image, and a noise classification unit that sets a flag level indicating a noise level for each pixel of the observed image according to the local statistical characteristics of the predicted original image; and a noise removal unit that adaptively sets a filter size according to the flag level to thereby remove noise, when the flag level for each pixel of the observed image is determined through the noise classification unit.

Here, the observed image local statistical extraction unit may extract a local average value and a local standard deviation of the observed image.

Also, the low-pass filter design unit may design a filter for each position of a pixel within a filter window using the local average and the local standard deviation of the observed image, a normalization constant, and a correction parameter.

Also, the predicted noise image generation unit may generate the predicted noise image by calculating the observed image and a filter coefficient designed by the low-pass filter design unit.

Also, the predicted original image local statistical extraction unit may extract the local statistical characteristics of the predicted original image using the local statistical characteristics of the observed image and the local statistical characteristics of the predicted noise image, by calculating a local average of the observed image and a local average of the predicted noise image to calculate a local average of the predicted original image and calculating a local standard deviation of the observed image and a local standard deviation of the predicted noise image to calculate a local standard deviation of the original image.

Also, the noise classification unit may set the flag level for each pixel of the observed image according to a difference between a local average of the predicted original image and a pixel value of the observed image.

Also, when the difference between the local average of the predicted original image and the pixel value of the observed image is smaller than a predetermined first threshold value, the flag level may be set as a low level.

Also, when the difference between the local average of the predicted original image and the pixel value of the observed image is larger than the predetermined first threshold value and smaller than a predetermined second threshold value, the flag level may be set as a middle level.

Also, when the difference between the local average of the predicted original image and the pixel value of the observed image is larger than the predetermined second threshold value, the flag level may be set as a high level.

Also, the noise removal unit may include a noise removal filter generation unit that adaptively changes a parameter and a filter window size according to the flag level which is classified by the noise classification unit and indicates predicted noise characteristics.

Also, the noise removal unit may further include an image restoration unit that restores an image using a filter coefficient generated by the noise removal filter generation unit.

Another aspect of the present invention provides an image processing method including: extracting local statistical characteristics of an observed image, generating a low-pass filter according to the local statistical characteristics to generate a predicted noise image, and extracting local statistical characteristics of the predicted noise image; extracting local statistical characteristics of a predicted original image using the local statistical characteristics of the observed image and the local statistical characteristics of the predicted noise image, and setting a flag level indicating a noise level for each pixel of the observed image according to the local statistical characteristics of the predicted original image to detect noise; and adaptively setting a filter coefficient according to the flag level of the detected noise to remove the noise, and restoring the image.

Here, the extracting of the local statistical characteristics of the observed image may include extracting a local average value and a local standard deviation of the observed image.

Also, the extracting of the local statistical characteristics of the predicted original image may include calculating a local average of the observed image and a local average of the predicted noise image to calculate a local average of the predicted original image and calculating a local standard deviation of the observed image and a local standard deviation of the predicted noise image to calculate a local standard deviation of the original image.

Also, the setting of the flag level may include setting the flag level as a low level when a difference between a local average of the predicted original image and a pixel value of the observed image is smaller than a predetermined first threshold value, setting the flag level as a middle level when the difference between the local average of the predicted original image and the pixel value of the observed image is larger than the predetermined first threshold value and smaller than a predetermined second threshold value, and setting the flag level as a high level when the difference between the local average of the predicted original image and the pixel value of the observed image is larger than the predetermined second threshold value.

Advantageous Effects

As described above, according to an embodiment of the present invention, it is possible to implement spatially adaptive noise detection and removal techniques of a distorted image corrupted by noise.

BEST MODE

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. Like numbers refer to like elements throughout the description of the figures.

Figure 1:
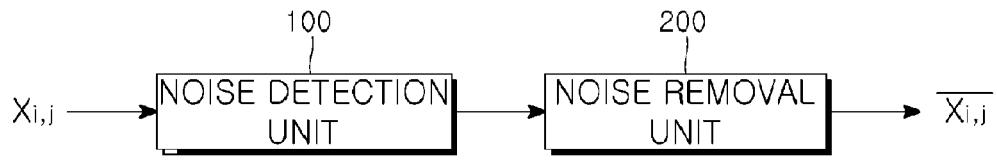
FIG. 1 is a control block diagram illustrating an image processing system according to an embodiment of the present invention.

FIG. 1 is a control block diagram illustrating an image processing system according to an embodiment of the present invention.

The image processing system may include a noise detection unit 100 and a noise removal unit 200.

The noise detection unit 100 may detect noise in an observed image. The noise detection unit 100 may extract local statistical characteristics of the observed image, and generate a predicted noise image using the extracted local statistical characteristics. The noise detection unit 100 may extract local statistical characteristics of the predicted noise image, and extract local statistical characteristics of a predicted original image using the local statistical characteristics of the observed image and local statistical characteristics of the predicted noise image. The noise detection unit 100 may compare the local statistical characteristics of the predicted original image and pixel values of the observed image to thereby designate a flag level indicating a level of noise for each pixel. When the flag level is higher, a size of a noise filter for image restoration is increased, and when the flag level is lower, the size of the noise filter is reduced. When the flag level is "0", the corresponding pixels of the observed image may be immediately applied as pixels of the predicted original image without applying the noise filter.

The noise removal unit 200 may adaptively set a filter size with respect to the observed image classified by the flag level through the noise detection unit 100 to thereby remove noise and restore an image. The noise removal unit 200 may increase the filter size to apply the corresponding filter when a noise level of the observed image, that is, the flag level is high, and immediately use the corresponding pixel in the image restoration without reducing the filter size or applying the corresponding filter.

Figure 2:
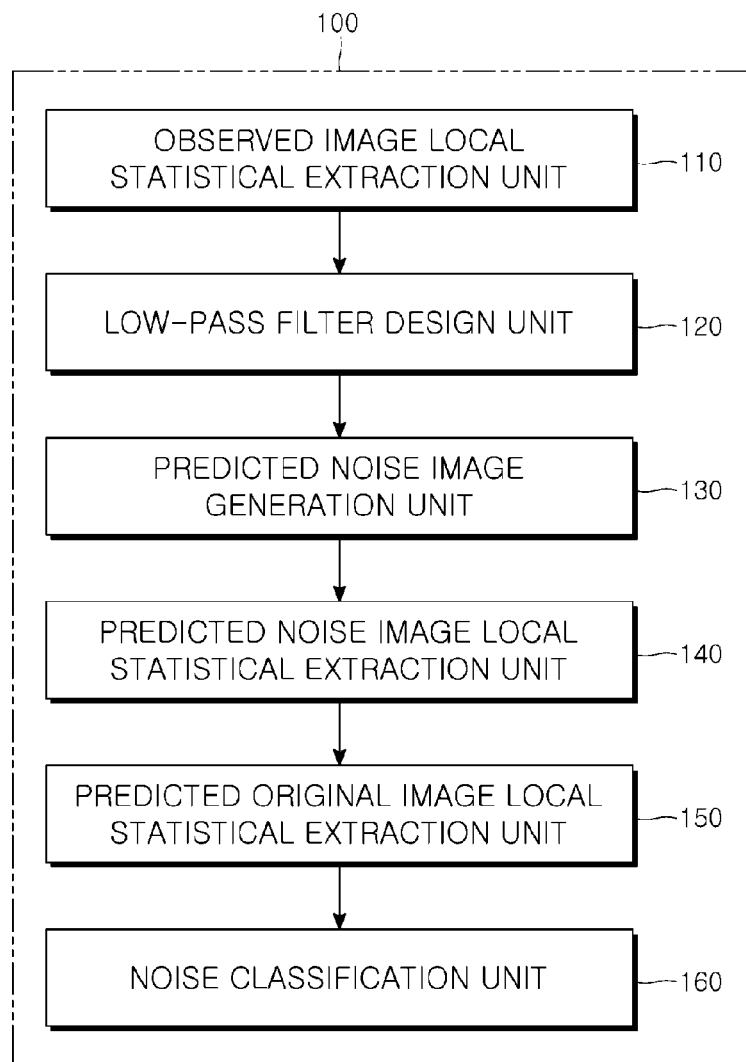
FIG. 2 is a detailed block diagram illustrating a noise detection unit included in an image processing system according to an embodiment of the present invention.

FIG. 2 is a detailed block diagram illustrating a noise detection unit included in an image processing system according to an embodiment of the present invention.

The noise detection unit 100 may include an observed image local statistical extraction unit 110, a low-pass filter design unit 120, a predicted noise image generation unit 130, a predicted noise image local statistical extraction unit 140, a predicted original image local statistical extraction unit 150, and a noise classification unit 160.

The observed image local statistical extraction unit 110 may detect local statistical characteristics of an input image.

The local statistical characteristics may include a local average value and a local standard deviation. When the local average value is higher, characteristics of noise may be expressed visually noticeable, and when the local standard deviation is increased, the characteristics of noise are expressed visually unnoticeable. Local statistical characteristics which are set in a window size (2K+1)×(2L+1) of an (i, j)-th pixel of an input image y are represented by the following Equations 1 and 2.

$$\mu_{i,j}^y = \frac{\sum_{m=-K}^{K}\sum_{n=-L}^{L} w_{m,n} y_{i+m,j+n}}{\sum_{m=-K}^{K}\sum_{n=-L}^{L} w_{m,n}}$$ [Equation 1]

$$\sigma_{i,j}^y = \frac{\sum_{m=-K}^{K}\sum_{n=-L}^{L} w_{m,n}|y_{i+m,j+n} - \mu_{m,n}^y|}{\sum_{m=-K}^{K}\sum_{n=-L}^{L} w_{m,n}}$$ [Equation 2]

In Equations 1 and 2, $\mu^y_{i,j}$ denotes a local average value of the image y, $\sigma^y_{i,j}$ denotes a weight given to pixels within a window, $w_{m,n}$ denotes a local standard deviation of the image y, and the same square window as that of L may be used as K.

The low-pass filter design unit 120 may design a low-pass Gaussian filter that is corrected for the (i, j)-th pixel using the local average extracted by the observed image local statistical extraction unit 110 and the local standard deviation. The low-pass filter Gaussian filter designed by the low-pass filter design unit 120 may be represented by the following Equation 3 to be applied.

$$h_{i+m,j+n} = \frac{1}{Z}\exp\left(-T\frac{(\sigma_{i,j}^y)^2(m^2+n^2)}{\sqrt{\mu_{i,j}^y+1}}\right)$$ [Equation 3]

for $-1 \le m, n \le 1$

In Equation 3, $h_{i+m,j+n}$ denotes a low-pass Gaussian filter, Z denotes a normalization constant, T denotes a correction parameter, and m and n denote a position of a pixel within a filter window.

The predicted noise image generation unit 130 may generate a predicted noise image using the low-pass Gaussian filter designed by the low-pass filter design unit 120. The predicted noise image generation unit 130 may be represented by the following Equation 4.

$$\hat{n} = y - \hat{x} = y - y*h$$ [Equation 4]

In Equation 4, $\hat{n}$ denotes a predicted noise image, $\hat{x}$ denotes a predicted original image, y denotes an observed image, and * denotes a convolution operator.

The predicted noise image local statistical extraction unit 140 extracts local statistical characteristics of the predicted noise image generated by the predicted noise image generation unit 130. The local statistical characteristics may include a local average value of the predicted noise image and a local standard deviation.

The predicted original image local statistical extraction unit 150 may extract local statistical characteristics of a predicted original image through the predicted noise image generated by the predicted noise image generation unit 130. The predicted original image local statistical extraction unit 150 may extract local statistical characteristics of the predicted original image using the local statistical characteristics of the predicted noise image and the local statistical characteristics of the observed image. As described above, the local statistical characteristics may include the local average value and the local standard deviation. The local statistical characteristics of the predicted original image may be represented by the following Equations 5 and 6.

$$\mu_{i,j}^{\hat{x}} = \mu_{i,j}^y - \mu_{i,j}^{\hat{n}}$$ [Equation 5]

$$\sigma_{i,j}^{\hat{x}} = \sqrt{(\sigma_{i,j}^y)^2 - (\sigma_{i,j}^{\hat{n}})^2}$$ [Equation 6]

Equations 5 and 6 show local statistical characteristic information of the predicted original image. In Equations 5 and 6, $\mu_{i,j}^{\hat{x}}$ denotes a local average of the predicted original image, and $\sigma_{i,j}^{\hat{x}}$ denotes a local standard deviation of the predicted original image. Referring to Equation 5, a difference between the local average of the observed image and the local average of the predicted noise image is the local average of the predicted original image. Referring to Equation 6, a value corresponding to the square root of a difference between a value corresponding to the square of the local standard deviation of the observed image and a value corresponding to the square of the local standard deviation of the predicted original image is the local standard deviation of the predicted original image.

Meanwhile, when the local statistical characteristics of the predicted original image is viewed from the (i, j)-th pixel of the observed image, a pixel having a large error with the local average $\mu_{i,j}^{\hat{x}}$ of the predicted original image may be classified into a pixel having a large noise level, and a case in which the pixel having the large error is a value within a predetermined range of the corresponding local average may be determined as a case in which a noise level is small or noise does not exist.

The noise classification unit 160 may perform a noise classification process according to the (i, j)-th pixel of the observed image based on the above description. Referring to the following Equation 7, when a flag level is "2", the flag level may be determined as a high level, when the flag level is "1", the flag level may be determined as a middle level, and when the flag level is "0", the flag level may be determined as a low level.

$$flag_{i,j}^y = \begin{cases} 2, & \text{if } y_{i,j} \le \mu_{i,j}^{\hat{x}} - T_2 \\ & \text{or } y_{i,j} \ge \mu_{i,j}^{\hat{x}} + T_2 \\ 1, & \text{if } \mu_{i,j}^{\hat{x}} - T_2 < y_{i,j} \le \mu_{i,j}^{\hat{x}} - T_1 \\ & \text{or } \mu_{i,j}^{\hat{x}} + T_1 \le y_{i,j} < \mu_{i,j}^{\hat{x}} + T_2 \\ 0, & \text{otherwise} \end{cases}$$ [Equation 7]

In Equation 7, T1 (first threshold value) and T2 (second threshold value) denote threshold values. In Equation 7, when a difference between the local average of the predicted original image and a pixel value of the observed image is smaller than a predetermined T1 (first threshold value), the flag level may be set as a low level (0), when the difference between the local average of the predicted original image and the pixel value of the observed image is larger than the predetermined T1 (first threshold value) and smaller than a predetermined T2 (second threshold value), the flag level may be set as a middle level, and when the difference between the local average of the predicted original image and the pixel value of the observed image is larger than the predetermined T2 (second threshold value), the flag level may be set as a high level.

When using a threshold value that is defined in advance in the classification process according to noise as shown in Equation 7, a change in noise classification performance according to local characteristics of the corresponding image or an amount of noise may occur to cause a significant problem. In order to solve this problem, according to an embodiment of the present invention, on the assumption that the predicted original image $\hat{x}$ and the observed image y have a Gaussian distribution, threshold values may be set according to the local statistical characteristics as shown in Equation 8.

$$\begin{cases} T_1 = \dfrac{\sigma_{i,j}^{\hat{x}}}{4} \\ T_2 = \dfrac{\sigma_{i,j}^{\hat{x}}}{2} \end{cases}$$ [Equation 8]

When the threshold values T1 and T2 of Equation 7 are set as shown in Equation 8, self-control capability according to image characteristics may be given in the noise classification process, using local activity. For example, a case in which $\sigma_{i,j}^{\hat{x}}$ is large corresponds to an area in which local activity of the (i, j)-th pixel of the observed image is large, and therefore the corresponding threshold value should be set to be large in order to avoid an excessive degradation phenomenon after removing the noise. A case in which $\sigma_{i,j}^{\hat{x}}$ is small corresponds to a flat area in which the local activity is small, and therefore the corresponding threshold value should be set to be small. In Equation 7, when the (i, j)-th pixel in which flag$^y_{i,j}$ is set as "0", a noise removal filter process is not performed, when the (i, j)-th pixel in which flag$^y_{i,j}$ is set as "1", the pixel is determined to have a relatively small amount of noise so that a noise removal process may be performed by applying a weak low-pass filter, and when the (i, j)-th pixel in which flag$^y_{i,j}$ is set as "2", the corresponding pixel is determined to have a relatively large amount of noise so that a strong low-pass filter may be applied.

Figure 3:
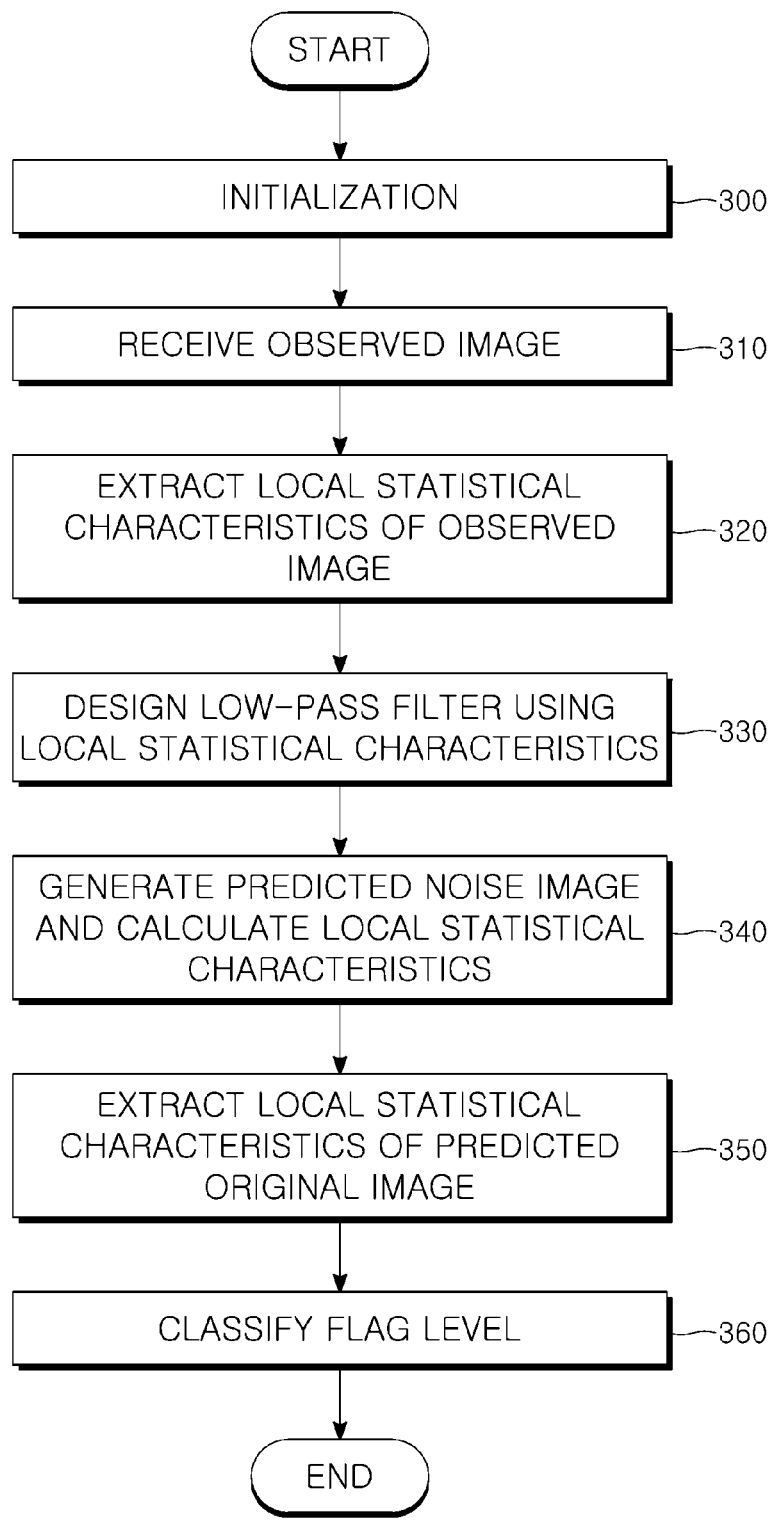
FIG. 3 is a control flowchart illustrating a noise detection unit included in an image processing system according to an embodiment of the present invention.

FIG. 3 is a control flowchart illustrating a noise detection unit included in an image processing system according to an embodiment of the present invention.

In operation 300, the noise detection unit 100 initializes each of a noise value of an input image and an index of a block image by a predetermined initial value.

The observed image local statistical extraction unit 110 may receive an image y in operation 310, and detect local statistical characteristics of an input image in operation 320. The local statistical characteristics may include a local average value and a local standard deviation as described above.

In operation 330, the low-pass filter design unit 120 may design a low-pass Gaussian filter using the local average and the local standard deviation which are extracted by the observed image local statistical extraction unit 110.

The predicted noise image generation unit 130 may generate a predicted noise image using the low-pass Gaussian filter designed by the low-pass filter design unit 120. In operation 340, the predicted noise image local statistical extraction unit 140 may extract local statistical characteristics of the predicted noise image generated by the predicted noise image generation unit 130.

In operation 350, the predicted original image local statistical extraction unit 150 may extract local statistical characteristics of a predicted original image using the local statistical characteristics of the predicted noise image generated by the predicted noise image generation unit 130 and the local statistical characteristics of the observed image generated by the observed image local statistical extraction unit 110.

The noise classification unit 160 classifies a noise level for each pixel by comparing a local average value of the predicted original image and a value of an (i, j)-th pixel of the observed image. In operation 360, the noise classification unit 160 may classify the noise level as a high level (2) when a difference between the local average value of the predicted original image and the pixel value is large, classify the noise level as a middle level (1) when the difference is a moderate value, and classify noise level as a low level or a zero level (0) when the difference is small or does not exist.

Figure 4:
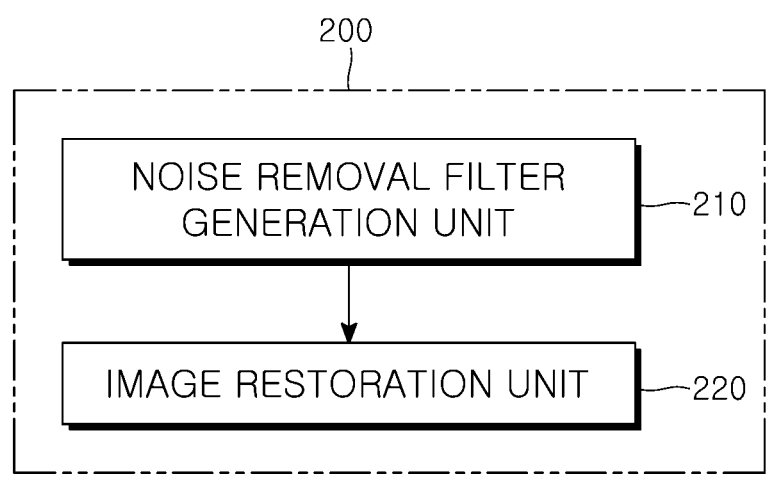
FIG. 4 is a detailed block diagram illustrating a noise removal unit included in an image processing system according to an embodiment of the present invention.

FIG. 4 is a detailed block diagram illustrating a noise removal unit included in an image processing system according to an embodiment of the present invention.

The noise removal unit 200 may include a noise removal filter generation unit 210 and an image restoration unit 220.

The noise removal filter generation unit 210 may adaptively change a parameter and a filter window size according to a flag level which is classified by the noise classification unit 160 and indicates predicted noise characteristics. The noise removal filter generation unit 210 may generate a filter coefficient as shown in Equation 9.

$$w_{m+i,n+j} = \frac{1}{E}\exp\left(-G\frac{(\sigma_{i,j}^{\hat{x}})^2(m^2+n^2)}{\sqrt{\mu_{i,j}^{\hat{x}}+1}}\right)$$ [Equation 9]

In Equation 9, $W_{m+i,n+j}$ denotes a filter coefficient of an (m, n)-th pixel within a filter window with respect to an (i, j)-th pixel, E denotes a modified normalization constant, and G denotes a correction parameter. In a filter coefficient of Equation 9, a filter coefficient value of a neighboring pixel is set to be smaller as a local distribution is increased so that the image degradation phenomenon of the present invention can be prevented, and the filter coefficient is set to be larger as an amount of noise is increased so that a strong low-pass filter may be applied.

The image restoration unit 220 may restore an image using the filter coefficient generated by the noise removal filter generation unit 210.

The image restoration unit 220 may restore the image using Equation 10.

$$\overline{x_{i,j}} = \frac{\sum_{m=-U}^{U}\sum_{n=-U}^{U} w_{m,n} y_{m+i,n+j}}{\sum_{m=-U}^{U}\sum_{n=-U}^{U} w_{m,n}},$$ [Equation 10]

for flag$_{i,j}$ = 2 or flag$_{i,j}$ = 1

$\overline{x_{i,j}} = y_{i,j}$, for flag$_{i,j}$ = 0

When flag$^y_{i,j}$ is "0", the image restoration unit 220 may determine that the corresponding pixel having flag$^y_{i,j}$ is a pixel in which a noise component does not exist, and thereby directly replace observed signals with restoration signals without performing a noise filtering operation. When flag$^y_{i,j}$ is "1" or "2", the image restoration unit 220 may restore the corresponding image by performing a noise removal filtering operation and convolution as shown in Equation 10.

Figure 5:
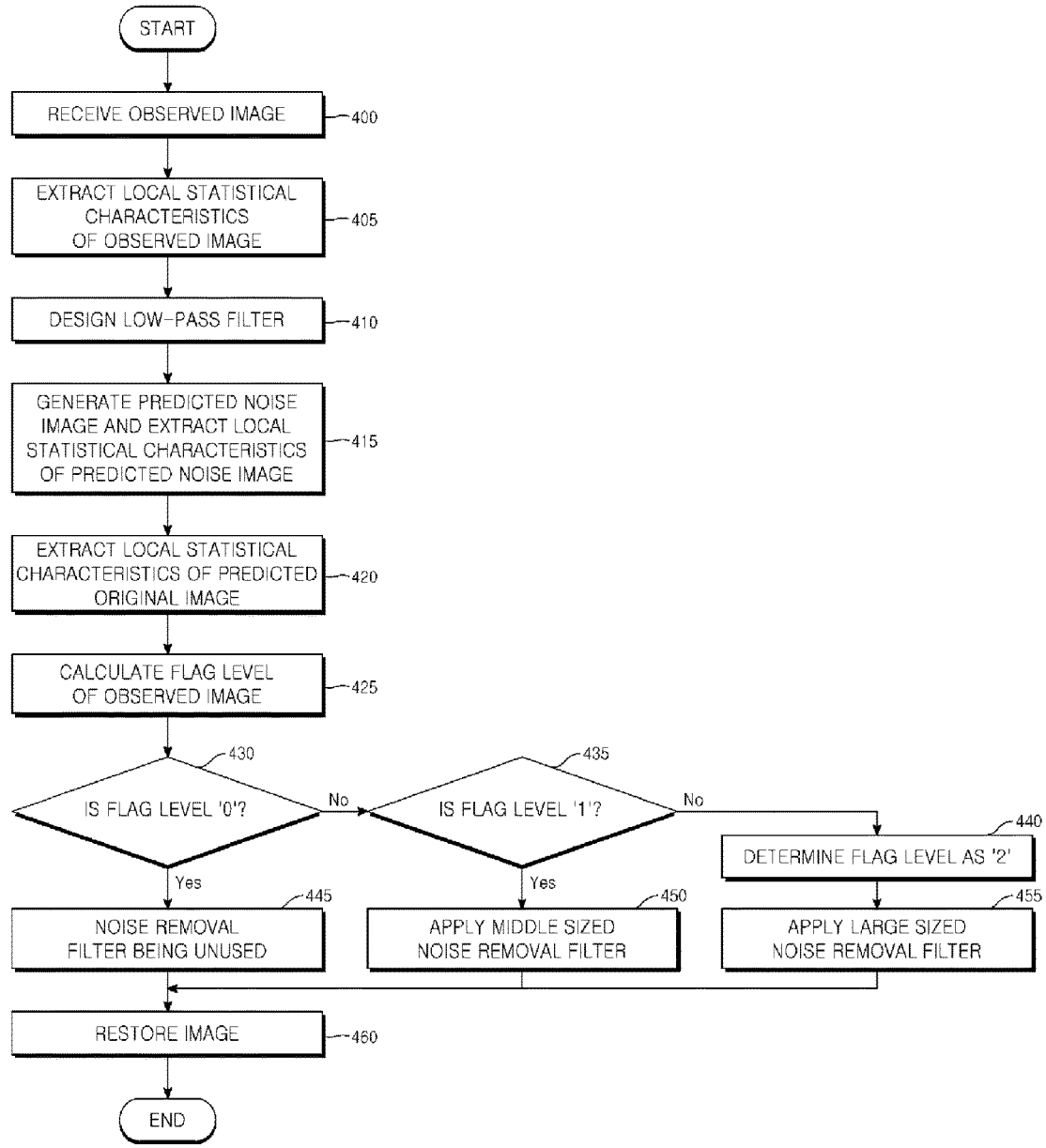
FIG. 5 is a control flowchart illustrating an image processing system according to an embodiment of the present invention.

FIG. 5 is a control flowchart illustrating an image processing system according to an embodiment of the present invention.

In operation 400, the observed image local statistical extraction unit 110 may receive an observed image with attached noise. In operation 405, the observed image local statistical extraction unit 110 may detect local statistical characteristics of the observed image. The local statistical characteristics of the observed image may include local average characteristics and local standard deviation characteristics of an image to which noise is attached to an original image.

In operation 410, the low-pass filter design unit 120 may design a low-pass Gaussian filter that is corrected for an (i, j)-th pixel, using the local average and local standard deviation which are extracted by the observed image local statistical extraction unit 110.

In operation 415, the predicted noise image generation unit 130 may generate a predicted noise image using the low-pass Gaussian filter designed by the low-pass filter design unit 120, and the predicted noise image local statistical extraction unit 140 may extract local statistical characteristics of the predicted noise image generated by the predicted noise image generation unit 130. The local statistical characteristics may include a local average value of the predicted noise image and a local standard deviation.

The predicted original image local statistical extraction unit 150 may extract local statistical characteristics of a predicted original image through the predicted noise image generated by the predicted noise image generation unit 130. In operation 420, the predicted original image local statistical extraction unit 150 may extract local statistical characteristics of the predicted original image using the local statistical characteristics of the predicted noise image and the local statistical characteristics of the observed image.

The noise classification unit 160 may perform a noise classification process according to the (i, j)-th pixel value of the observed image. The noise classification unit 160 may calculate a flag level according to a pixel value of the observed image. The flag level indicates a noise level that is calculated by comparing the pixel value of the observed image and a local average value of the predicted original image. The flag level may be 0, 1, and 2, and obviously, other criteria may be applied. Here, on the assumption that the flag levels are 0, 1, and 2, examples are given in operation 425.

The noise removal filter generation unit 210 may adaptively change a parameter and a filter window size according to flag$^y_{i,j}$ which is classified by the noise classification unit 160 and indicates predicted noise characteristics. In operations 430 and 445, the noise removal filter generation unit 210 may enable a pixel whose flag level is "0" to pass as is without using a noise removal filter, and use the pixel in restoration of the original image, and thereby does not generate a noise removal filter.

When the flag level is "1" or "2", the noise removal filter generation unit 210 may set a size of the noise removal filter to be different from each other, and use the noise removal filter with different sizes in restoration of the original image.

The noise removal filter generation unit 210 may generate a noise filter with a 3×3 size when the flag level is "1", and generate a noise filter with a 5×5 size when the flag filter is "2" in operations 435, 440, 450, and 455.

The image restoration unit 220 may restore an image by applying the filter generated by the noise removal filter generation unit 210 for each pixel of the observed image. In operation 430 to 460, when the flag level is "0", the image restoration unit 220 may determine that the corresponding pixel having the flag level is a pixel in which a noise component does not exist, and thereby directly replace the observed signals with restoration signals without performing the noise filtering operation. In operation 430 to 460, when the flag level is "1" or "2", the image restoration unit 220 may restore the corresponding image using the noise removal filter whose size is different for each of the corresponding flag levels.

As described above, according to an embodiment of the present invention, it is possible to implement spatially adaptive noise detection and removal techniques of a distorted image corrupted by noise.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An image processing system comprising:
   a noise detection circuit comprising,
      an observed image local statistical extraction circuit that extracts a first local statistical characteristics from an observed image,
      a low-pass filter design circuit that designs a low-pass Gaussian filter according to the first local statistical characteristics from the observed image,
      a predicted noise image generation circuit that generates a predicted noise image using the low-pass Gaussian filter,
      a predicted noise image local statistical extraction circuit that extracts a second local statistical characteristics from the predicted noise image,
      a predicted original image local statistical extraction circuit that extracts a third local statistical characteristics from a predicted original image using the first local statistical characteristics of the observed image and the second local statistical characteristics of the predicted noise image, and
      a noise classification circuit that sets a flag level indicating a noise level for each pixel of the observed image according to the third local statistical characteristics of the predicted original image; and
   a noise removal circuit that sets a filter size according to the flag level and that removes noise, when the flag level for the each pixel of the observed image is determined at the noise classification circuit.

2. The image processing system according to claim 1, wherein the predicted noise image generation circuit generates the predicted noise image using the low-pass Gaussian filter by calculating the observed image and a filter coefficient designed by the low-pass filter design circuit.

3. The image processing system according to claim 1, wherein the predicted original image local statistical extraction circuit extracts the third local statistical characteristics from the predicted original image using the first local statistical characteristics of the observed image and the second local statistical characteristics of the predicted noise image by calculating:

a local average of the predicted original image, wherein the local average of the predicted original image is calculated by a local average of the observed image and a local average of the predicted noise image, and a local standard deviation of the original image, wherein the local standard deviation of the original image is calculated by a local standard deviation of the observed image and a local standard deviation of the predicted noise image.

4. The image processing system according to claim 1, wherein the noise classification circuit sets the flag level for the each pixel of the observed image according to a difference between a local average of the predicted original image and a pixel value of the observed image.

5. The image processing system according to claim 4, wherein, when the difference between the local average of the predicted original image and the pixel value of the observed image is less than a predetermined first threshold value, the flag level is set as a low level.

6. The image processing system according to claim 5, wherein, when the difference between the local average of the predicted original image and the pixel value of the observed image is greater than the predetermined first threshold value and smaller than a predetermined second threshold value, the flag level is set as a middle level.

7. The image processing system according to claim 6, wherein, when the difference between the local average of the predicted original image and the pixel value of the observed image is greater than the predetermined second threshold value, the flag level is set as a high level.

8. The image processing system according to claim 1, wherein the noise removal circuit includes a noise removal filter generation circuit that changes a parameter and a filter window size according to the flag level which is classified by the noise classification circuit and indicates predicted noise characteristics.

9. The image processing system according to claim 8, wherein the noise removal circuit further includes an image restoration circuit that restores an image using a filter coefficient generated by the noise removal filter generation circuit.

10. An image processing method comprising:

extracting a first local statistical characteristics from an observed image;

generating a low-pass filter according to the first local statistical characteristics to generate a predicted noise image;

extracting a second local statistical characteristics from the predicted noise image;

extracting a third local statistical characteristics from a predicted original image using the first local statistical characteristics of the observed image and the second local statistical characteristics of the predicted noise image;

setting a flag level indicating a noise level for each pixel of the observed image according to the third local statistical characteristics of the predicted original image so as to detect noise;

setting a filter coefficient according to the flag level of the detected noise to remove the noise; and restoring the observed image.

11. The image processing method according to claim 10, wherein the setting of the flag level further comprises:

setting the flag level as a low level when a difference between a local average of the predicted original image and a pixel value of the observed image is less than a predetermined first threshold value, setting the flag level as a middle level when the difference between the local average of the predicted original image and the pixel value of the observed image is greater than the predetermined first threshold value and less than a predetermined second threshold value, and setting the flag level as a high level when the difference between the local average of the predicted original image and the pixel value of the observed image is greater than the predetermined second threshold value.

* * * * *